(12) United States Patent  
Sonneborn

(10) Patent No.: US 9,205,919 B1  
(45) Date of Patent: *Dec. 8, 2015

(54) APPARATUS AND METHOD FOR ROLL MOMENT EQUALIZATION AT HIGH ADVANCE RATIOS FOR ROTARY WING AIRCRAFT

(71) Applicant: Groen Brothers Aviation, Inc., Salt Lake City, UT (US)

(72) Inventor: Walter Gerd Oskar Sonneborn, Colleyville, TX (US)

(73) Assignee: GROEN BROTHERS AVIATION, INC., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/999,366

(22) Filed: Feb. 13, 2014

Related U.S. Application Data

(63) Continuation of application No. 13/199,679, filed on Sep. 7, 2011, now Pat. No. 8,668,162.

(60) Provisional application No. 61/403,136, filed on Sep. 9, 2010, provisional application No. 61/381,347, filed on Sep. 9, 2010, provisional application No. 61/429,289, filed on Jan. 3, 2011, provisional application No. 61/499,996, filed on Jun. 22, 2011, provisional application No. 61/429,282, filed on Jan. 3, 2011.

(51) Int. Cl.
| | | |
|---|---|---|
| *B64C 27/57* | (2006.01) | |
| *B64C 27/26* | (2006.01) | |
| *B64C 27/615* | (2006.01) | |
| *B64C 27/54* | (2006.01) | |
| *B64C 27/02* | (2006.01) | |
| *B64C 27/18* | (2006.01) | |
| *B64C 27/72* | (2006.01) | |

(52) U.S. Cl.
CPC .............. *B64C 27/57* (2013.01); *B64C 27/025* (2013.01); *B64C 27/18* (2013.01); *B64C 27/26* (2013.01); *B64C 27/54* (2013.01); *B64C 27/615* (2013.01); *B64C 2027/7261* (2013.01)

(58) Field of Classification Search
CPC ........ B64C 27/54; B64C 27/56; B64C 27/57; B64C 27/58; B64C 27/615; B64C 27/72; B64C 2027/7261

See application file for complete search history.

(56) References Cited

U.S. PATENT DOCUMENTS

| | | | |
|---|---|---|---|
| 2,601,463 A | | 6/1952 | Stanley |
| 2,652,898 A | * | 9/1953 | Renoux .................. 416/114 |
| 3,494,424 A | | 2/1970 | Stanley |
| 4,589,611 A | | 5/1986 | Ramme et al. |
| 4,928,907 A | * | 5/1990 | Zuck .................. 244/6 |
| 5,934,873 A | | 8/1999 | Greene |
| 6,513,752 B2 | * | 2/2003 | Carter, Jr. .................. 244/8 |

(Continued)

*Primary Examiner* — Joseph W Sanderson  
(74) *Attorney, Agent, or Firm* — Pate Baird, PLLC

(57) ABSTRACT

A method for equalizing rolling moments at high advance ratios is disclosed including impelling an aircraft in a forward direction at an airspeed by means of a thrust source and rotating a rotor of the aircraft at an angular velocity with respect to the airspeed effective to cause a positive total lift on each blade due to air flow over the blades in the retreating direction when the blade is moving in the retreating direction. The rotor includes an even number of blades placed at equal angular intervals around the rotor hub. One or both of cyclic pitch and rotor angle of attack are adjusted such that a rolling moment of the retreating blade due to reverse air flow is between 0.3 and 0.7 times a rolling moment on the advancing blade due to lift.

16 Claims, 8 Drawing Sheets

(56) References Cited

U.S. PATENT DOCUMENTS

| | | |
|---|---|---|
| 7,147,182 B1 | 12/2006 | Flanigan |
| 7,434,763 B2 * | 10/2008 | Walliser et al. ............... 244/7 R |
| 7,611,090 B2 * | 11/2009 | Oleshchuk et al. .......... 244/12.5 |
| 8,403,255 B2 * | 3/2013 | Piasecki ........................... 244/6 |
| 8,668,162 B1 * | 3/2014 | Sonneborn ....................... 244/6 |
| 2002/0011539 A1 * | 1/2002 | Carter, Jr. ........................ 244/6 |
| 2008/0237392 A1 * | 10/2008 | Piasecki et al. ................... 244/6 |
| 2010/0001120 A1 * | 1/2010 | Sun .................................. 244/6 |

* cited by examiner

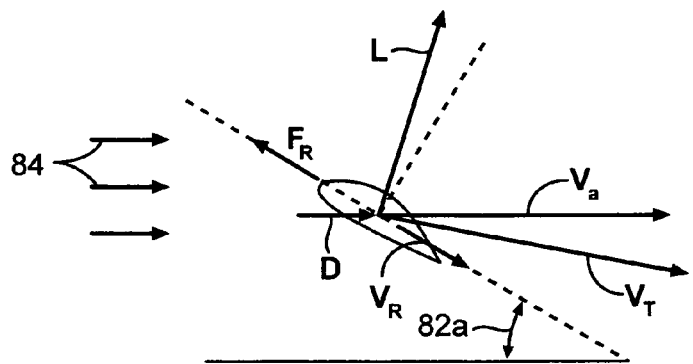
FIG. 5A
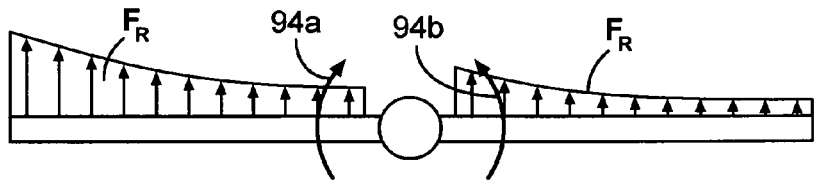
FIG. 5B
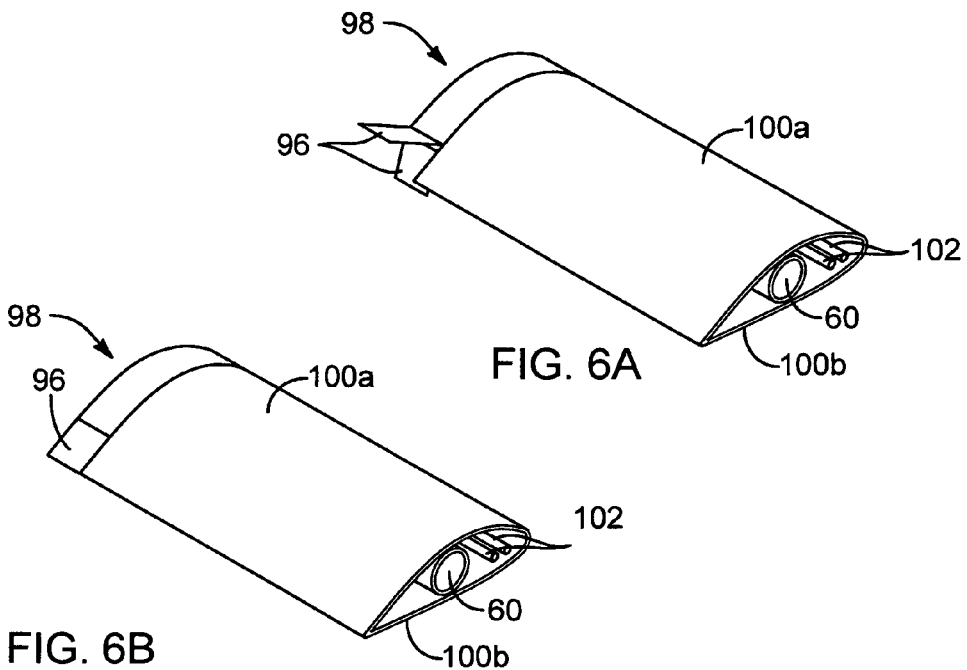
FIG. 6A
FIG. 6B

APPARATUS AND METHOD FOR ROLL MOMENT EQUALIZATION AT HIGH ADVANCE RATIOS FOR ROTARY WING AIRCRAFT

RELATED APPLICATIONS

This application: is a continuation of U.S. patent application Ser. No. 13/199,679, filed Sep. 7, 2011; which claims the benefit of U.S. Provisional Patent Application Ser. No. 61/403,136, filed Sep. 9, 2010; claims the benefit of U.S. Provisional Patent Application Ser. No. 61/381,347, filed Sep. 9, 2010; claims the benefit of U.S. Provisional Patent Application Ser. No. 61/429,289, filed Jan. 3, 2011; claims the benefit of U.S. Provisional Patent Application Ser. No. 61/499,996, filed Jun. 22, 2011; claims the benefit of U.S. Provisional Patent Application Ser. No. 61/429,282, filed Jan. 3, 2011; all of which are hereby incorporated by reference.

Additionally, this patent application hereby incorporates by reference U.S. Pat. No. 5,301,900, issued Apr. 12, 1994 to Groen et al., U.S. Pat. No. 1,947,901, issued Feb. 20, 1934 to J. De la Cierva, and U.S. Pat. No. 2,352,342, issued Jun. 27, 1944 to H. F. Pitcairn.

RIGHTS OF U.S. GOVERNMENT

The U.S. Government has a paid-up license in this invention and the right in limited circumstances to require the patent owner to license others on reasonable terms as provided for by the terms of Contract No. HR011-09-C-0020 awarded by DARPA/TTO.

BACKGROUND

1. The Field of the Invention

This invention relates to rotating wing aircraft, and, more particularly to rotating wing aircraft relying on autorotation of a rotor to provide lift.

2. The Background Art

Rotating wing aircraft rely on a rotating wing to provide lift. In contrast, fixed wing aircraft rely on air flow over a fixed wing to provide lift. Fixed wing aircraft must therefore achieve a minimum ground velocity on takeoff before the lift on the wing is sufficient to overcome the weight of the plane. Fixed wing aircraft therefore generally require a long runway along which to accelerate to achieve this minimum velocity and takeoff.

In contrast, rotating wing aircraft can take off and land vertically or along short runways inasmuch as powered rotation of the rotating wing provides the needed lift. This makes rotating wing aircraft particularly useful for landing in urban locations or undeveloped areas without a proper runway.

The most common rotating wing aircraft in use today are helicopters. A helicopter typically includes a fuselage, housing an engine and passenger compartment, and a rotor, driven by the engine, to provide lift. Forced rotation of the rotor causes a reactive torque on the fuselage. Accordingly, conventional helicopters require either two counter rotating rotors or a tail rotor in order to counteract this reactive torque.

Another type of rotating wing aircraft is the autogyro. An autogyro aircraft derives lift from an unpowered, freely rotating rotor or plurality of rotary blades. The energy to rotate the rotor results from a windmill-like effect of air passing through the underside of the rotor. The forward movement of the aircraft comes in response to a thrusting engine such as a motor driven propeller mounted fore or aft.

During the developing years of aviation aircraft, autogyro aircraft were proposed to avoid the problem of aircraft stalling in flight and to reduce the need for runways. The relative airspeed of the rotating wing is independent of the forward airspeed of the autogyro, allowing slow ground speed for takeoff and landing, and safety in slow-speed flight. Engines may be tractor-mounted on the front of an autogyro or pusher-mounted on the rear of the autogyro.

Airflow passing the rotary wing, alternately called rotor blades, which are tilted upward toward the front of the autogyro, act somewhat like a windmill to provide the driving force to rotate the wing, i.e. autorotation of the rotor. The Bernoulli effect of the airflow moving over the rotor surface creates lift.

Various autogyro devices in the past have provided some means to begin rotation of the rotor prior to takeoff, thus further minimizing the takeoff distance down a runway. One type of autogyro is the "gyrodyne," which includes a gyrodyne built by Fairey aviation in 1962 and the XV-1 convertiplane first flight tested in 1954. The gyrodyne includes a thrust source providing thrust in a flight direction and a large rotor for providing autorotating lift at cruising speeds. To provide initial rotation of the rotor, jet engines were secured to the tip of each blade of the rotor and powered during takeoff, landing, and hovering.

Although rotating wing aircraft provide the significant advantage of vertical takeoff and landing (VTOL), they are much more limited in their maximum flight speed than are fixed wing aircraft. The primary reason that prior rotating wing aircraft are unable to achieve high flight speed is a phenomenon known as "retreating blade stall." As the fuselage of the rotating wing aircraft moves in a flight direction, rotation of the rotor causes each blade thereof to be either "advancing" or "retreating."

That is, in a fixed-wing aircraft, all wings move forward in fixed relation, with the fuselage. In a rotary-wing aircraft, the fuselage moves forward with respect to the air. However, rotor blades on both sides move with respect to the fuselage. Thus, the velocity of any point on any blade is the velocity of that point, with respect to the fuselage, plus the velocity of the fuselage. A blade is advancing if it is moving in the same direction as the flight direction. A blade is retreating if it is moving opposite the flight direction.

The rotor blades are airfoils that provide lift that depends on the speed of air flow thereover. The advancing blade therefore experiences much greater lift than the retreating blade. One technical solutions to this problem is that the blades of the rotors are allowed to "flap." That is, the advancing blade is allowed to fly or flap upward in response to the increased air speed thereover such that its blade angle of attack is reduced. This reduces the lift exerted on the blade. The retreating blade experiences less air speed and tends to fly or flap downward such that its blade angle of attack is increased, which increases the lift exerted on the blade.

Flap enables rotating wing aircraft to travel in a direction perpendicular to the axis of rotation of the rotor. However, lift equalization due to flapping is limited by a phenomenon known as "retreating blade stall." As noted above, flapping of the rotor blades increases the angle of attack of the retreating blade. However, at certain higher speeds, the increase in the blade angle of attack required to equalize lift on the advancing and retreating blades results in loss of lift (stalling) of the retreating blade.

A second limit on the speed of rotating wing aircraft is the drag at the tips of the rotor. The tip of the advancing blade is moving at a speed equal to the speed of the aircraft and relative to the air, plus the speed of the tip of the blade with respect to the aircraft. That is equal to the sum of the flight speed of the rotating wing aircraft plus the product of the length of the blade and the angular velocity of the rotor. In helicopters, the rotor is forced to rotate in order to provide both upward lift and thrust in the direction of flight. Increasing the speed of a helicopter therefore increases the air speed at the rotor or blade tip, both because of the increased flight speed and the increased angular velocity of the rotors required to provide supporting thrust.

The air speed over the tip of the advancing blade can therefore exceed the speed of sound even though the flight speed is actually much less. As the air speed over the tip approaches the speed of sound, the drag on the blade becomes greater than the engine can overcome. In autogyro aircraft, the tips of the advancing blades are also subject to this increased drag, even for flight speeds much lower than the speed of sound. The tip speed for an autogyro is typically smaller than that of a helicopter, for a given airspeed, since the rotor is not driven. Nevertheless, the same drag increase occurs eventually.

A third limit on the speed of rotating wing aircraft is reverse air flow over the retreating blade. As noted above, the retreating blade is traveling opposite the flight direction with respect to the fuselage. At certain high speeds, portions of the retreating blade are moving rearward, with respect to the fuselage, slower than the flight speed of the fuselage. Accordingly, the direction of air flow over these portions of the retreating blade is reversed from that typically designed to generate positive lift. Air flow may instead generate a negative lift, or downward force, on the retreating blade. For example, if the blade angle of attack is upward with respect to wind velocity, but wind is moving over the wing in a reverse direction, the blade may experience negative lift.

The ratio of the maximum air speed of a rotating wing aircraft to the maximum air speed of the tips of the rotor blades is known as the "advance ratio. The maximum advance ratio of rotary wing aircraft available today is less than 0.5, which generally limits the top flight speed of rotary wing aircraft to less than 200 miles per hour (mph). For most helicopters, that maximum achievable advance ratio is between about 0.3 and 0.4.

In view of the foregoing, it would be an advancement in the art to provide a rotating wing aircraft capable of vertical takeoff and landing and flight speeds in excess of 200 mph.

BRIEF SUMMARY OF THE INVENTION

The invention has been developed in response to the present state of the art and, in particular, in response to the problems and needs in the art that have not yet been fully solved by currently available apparatus and methods. The features and advantages of the invention will become more fully apparent from the following description and appended claims, or may be learned by practice of the invention as set forth hereinafter.

Consistent with the foregoing, a method for operating a rotary wing aircraft includes impelling an aircraft in a forward direction at an airspeed by means of a thrust source, the aircraft having secured thereto a rotor comprising an even number of blades secured at equal angular intervals around a rotor hub rotationally mounted to the aircraft, the rotor operable to rotate about an axis of rotation. The blades may be rigidly connected to the rotor hub.

The rotor is rotated at an angular velocity with respect to the aircraft such that each blade is alternately moving in a retreating direction and an advancing direction with respect to the aircraft. The retreating direction has a component opposite the forward direction and the advancing direction has a component in the forward direction. The angular velocity and airspeed are effective to cause a positive total lift on each blade due to air flow over the blade resulting from the blade angle of attack with respect to the air in the retreating direction when the blade is moving in the retreating direction. In some embodiments, the number of blades is four.

In some embodiments, rotation of the rotor defines a rotor disc defining, in turn, a rotor disk angle of attack. However, a blade angle of attack exists also with respect to, and above, the forward direction. The blade angle of attack, or simply angle of attack, is effective to cause a bending moment on the blades, even when moving in the retreating direction, due to lift. It may be equal to between 0.3 and 0.7 time the beam bending moment experienced by the blades, when moving in the advancing direction, due to lift.

In some embodiments, each blade defines or has its own individual pitch angle relative to a direction of blade movement. The pitch angle may be cyclically modulated effective to cause a bending moment induced on the blades due to lift when moving in the retreating direction. To be equal to between 0.3 and 0.7 times a bending moment induced in the blades due to lift when moving in the advancing direction.

In some embodiments, the aircraft includes wings providing lift sufficient to support at least 50 percent, and preferably up to 90 percent of the weight of the aircraft at airspeeds greater than 200 miles per hour. In some embodiments, the airspeed may be greater than 200, preferably 300, and more preferably 400 miles per hour.

In some embodiments, the aircraft includes jets, fed by the aircraft's propulsive jet engines, secured to tips of the blades. The blades define an air channel in fluid communication with the tip jets. The air channel may be in fluid communication with a pressurized air source. In some embodiments, the thrust source is a jet engine and the air source comprises a bypass turbine of the jet engine.

A corresponding apparatus and flight control system for performing the method are also disclosed and claimed herein.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 5A is a vector diagram illustrating forces exerted on a blade cross section;

FIG. 5B is a load diagram illustrating rotational forces exerted on a rotor in embodiments of rotors in accordance with the present invention;

FIGS. 6A and 6B are isometric views illustrating a blade configuration suitable for selectively increasing drag embodiments of a retreating blade in accordance with the present invention;

DETAILED DESCRIPTION OF THE PREFERRED EMBODIMENTS

Figure 1:
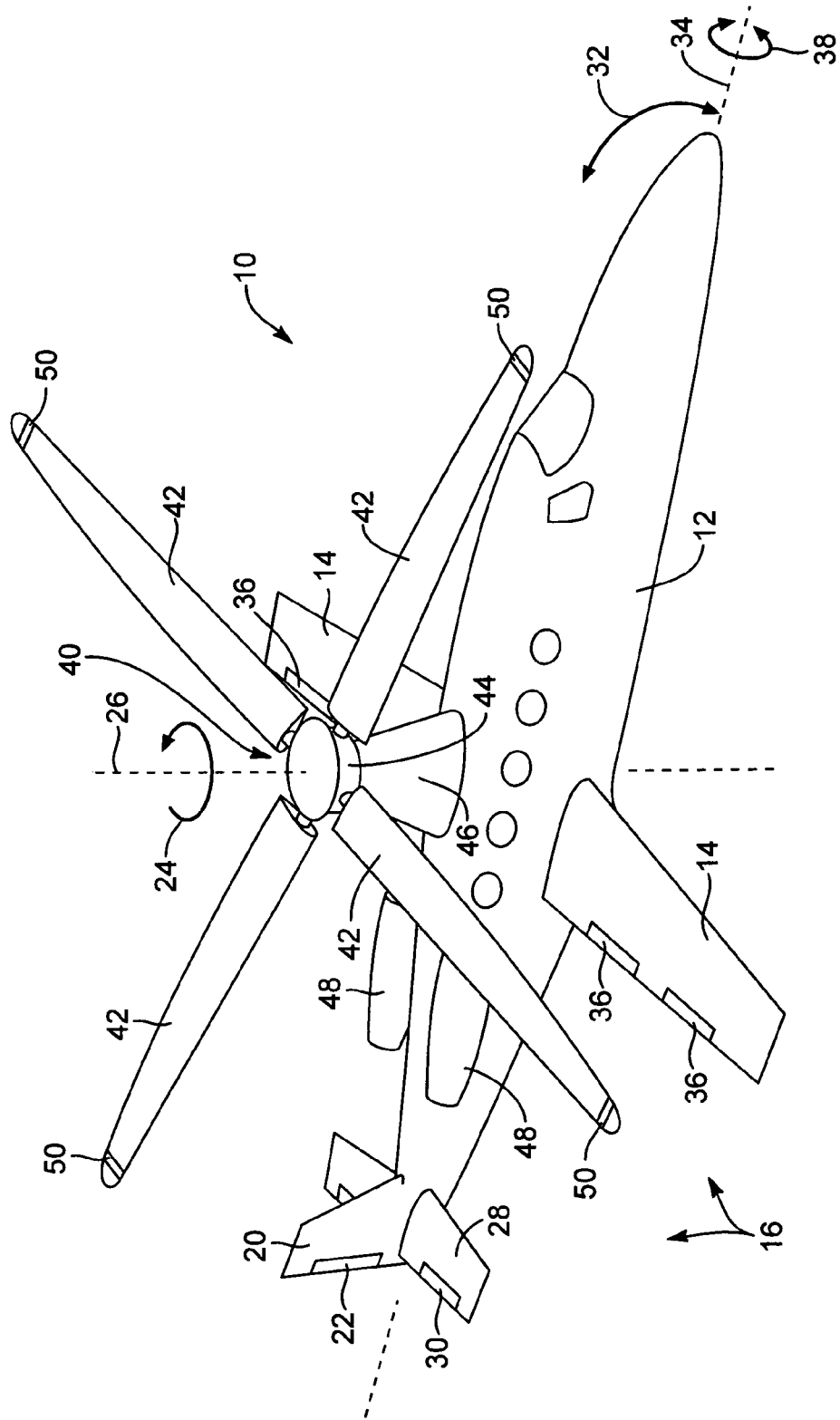
FIG. 1 is an isometric view of an aircraft in accordance with an embodiment of the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

This patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H. F. Pitcairn.

Referring to FIG. 1, an aircraft 10 includes a fuselage 12 defining a cabin for carrying an operator, passengers, cargo, or the like. The fuselage 12 may include one or more fixed wings 14 shaped as airfoils for providing lift to the aircraft. The wings 14 may be configured such that they provide sufficient lift to overcome the weight of the aircraft 10 only at comparatively high speeds inasmuch as the aircraft 10 is capable of vertical takeoff and landing (VTOL) and does not need lift from the fixed wings 14 at low speeds, e.g. below 50 mph or even 100 mph upon taking off.

In this manner, the wings 14 may be made smaller than those of fixed wing aircraft requiring a high velocity takeoff, which results in lower drag at higher velocities. In some embodiments the wings 14 provide sufficient lift to support at least 50 percent, preferably 90 percent, of the weight of the aircraft 10 at air speeds above 200 mph.

Control surfaces 16 may secure to one or both of the fuselage 12 and wings 14. For example a tail structure 18 may include one or more vertical stabilizers 20 and one or more rudders 22. The rudders 22 may be adjustable as known in the art to control the yaw 24 of the aircraft 10 during flight. As known in the art, yaw 24 is defined as rotation about a vertical axis 26 of the aircraft 10. In the illustrated embodiment, the rudders 22 may comprise hinged portions of the vertical stabilizers 20.

The tail structure 18 may further include a horizontal stabilizer 28 and an elevator 30. The elevator 30 may be adjustable as known in the art to alter the pitch 32 of the aircraft 10. As known in the art, pitch 32 is defined as rotation in a plane containing the vertical axis 26 and a longitudinal axis 34 of the fuselage of an aircraft 10. In the illustrated embodiment, the elevator 30 is a hinged portion of the horizontal stabilizer 28. In some embodiments, twin rudders 22 may be positioned at an angle relative to the vertical axis 26 and serve both to adjust the yaw 24 and pitch 32 of the aircraft 10.

The control surfaces 16 may also include ailerons 36 on the wings 14. As known in the art, ailerons 36 are used to control roll 38 of the airplane. As known in the art, roll 38 is defined as rotation about the longitudinal axis 34 of the aircraft 10.

Lift during vertical takeoff and landing and for augmenting lift of the wings 14 during flight is provided by a rotor 40 comprising a number of individual blades 42. The blades are mounted to a rotor hub 44. The hub 44 is coupled to a mast 46 which couples the rotor hub 44 to the fuselage 12. The rotor 40 may be selectively powered by one or more engines 48 housed in the fuselage 12, or adjacent nacelles, and coupled to the rotor 40. In some embodiments, jets 50 located at or near the tips of the blades 42 power the rotor 40 during takeoff, landing, hovering, or when the flight speed of the aircraft is insufficient to provide sufficient autorotation to develop needed lift.

Figure 2:
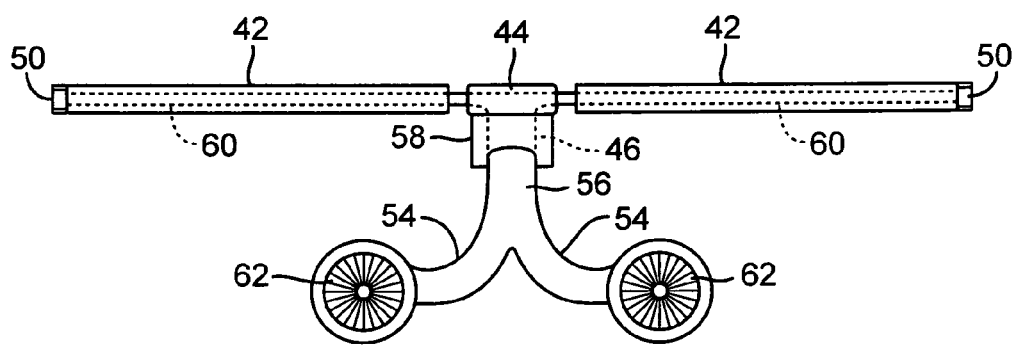
FIG. 2 is a front elevation view of a compressed or otherwise pressurized air supply for a tip jet in accordance with an embodiment of the present invention.

Referring to FIG. 2, while still referring to FIG. 1, in the illustrated embodiment, the engines 48 may be embodied as jet engines 48 that provide thrust during flight of the aircraft. The jet engines 48 may additionally supply compressed air to the jets 46 by driving a bypass turbine 62 or auxiliary compressor. Air compressed by the bypass turbine 62 may be transmitted through ducts 54 to a plenum 56 in fluid communication with the ducts 54.

The plenum 56 is in fluid communication with the mast 46 that is hollow or has another passage to provide for air conduction. A mast fairing 58 positioned around the mast 46 may provide one or both of an air channel and a low drag profile for the mast 46. The mast 46 or mast fairing 58 is in fluid communication with the rotor hub 44. The rotor hub 44 is in fluid communication with blade ducts 60 extending longitudinally through the blades 42 to feed the tip jets 50.

Figure 3A:
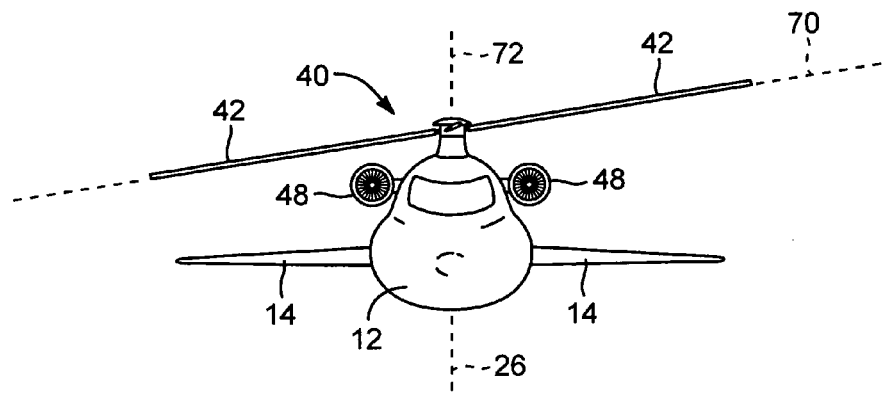
FIG. 3A is a front elevation view of a rotor craft illustrating operational parameters describing a rotor configuration suitable for use in accordance with embodiments of an apparatus and method in accordance with the present invention and the system of FIGS. 1 and 2 in particular.
Figure 3B:
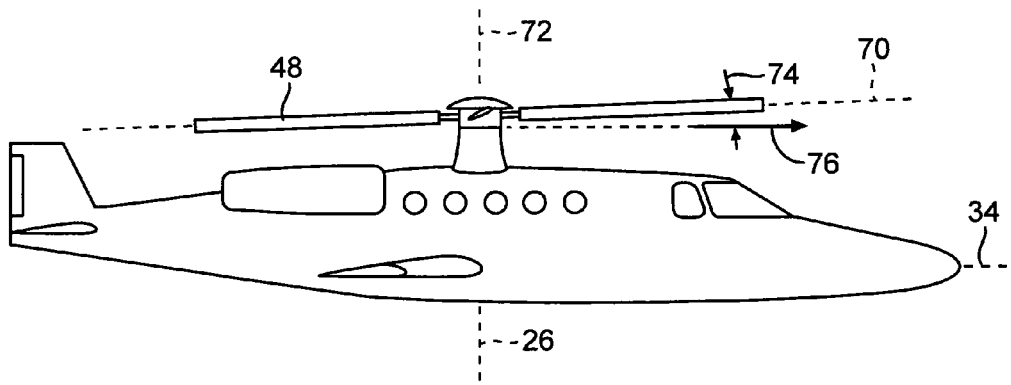
FIG. 3B is a right side elevation view of the rotor craft of FIG. 3A.
Figure 3C:
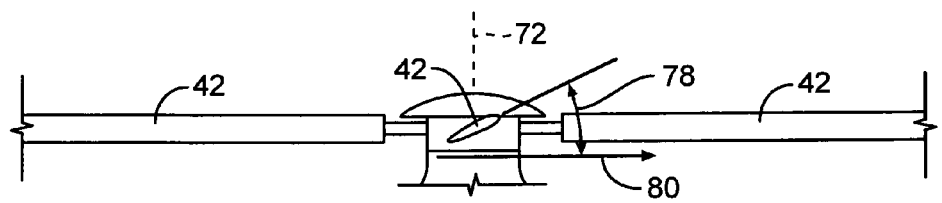
FIG. 3C is a partial cut of a right side elevation view of the rotor of FIG. 3A.

Referring to FIGS. 3A-3C, rotation of the rotor 40 about its axis of rotation 72 occurs in a rotor disc 70 that is generally planar but may be contoured due to flexing of the blades 42 during flight. In general, the rotor disc 70 may be defined as a plane in which the tips of the blades 42 travel. Inasmuch as the blades 42 flap cyclically upward and downward due to changes in lift while advancing and retreating, the rotor disc 70 is angled with respect to the axis of rotation when viewed along the longitudinal axis 34, as shown in FIG. 3A.

Referring to FIG. 3B, the angle 74 of the rotor disc 70, relative to a flight direction 76 in the plane containing the longitudinal axis 34 and vertical axis 26, is defined as the angle of attack 74 or rotor disk angle of attack 74. For purposes of this application, flight direction 76 and air speed refer to the direction and speed, respectively, of the fuselage 12 of the aircraft 10 relative to surrounding air. In autogyro systems, the angle of attack 74 of the rotor disc 70 is generally positive in order to achieve autorotation of the rotor 40, which in turn generates lift.

Referring to FIG. 3C, the surfaces of the blades 42, and particularly the chord of each blade 42, define a pitch angle 78, or blade angle of attack 78, relative to the direction of movement 80 of the blades 42. In general, a higher pitch angle 78 will result in more lift and higher drag on the blade up to the point where stalling occurs, at which point lift has declined below a value necessary to sustain flight. the pitch angle 78 of the blade 42 may be controlled by both cyclic and collective pitch control as known in the art of rotary wing aircraft design.

Figure 4A:
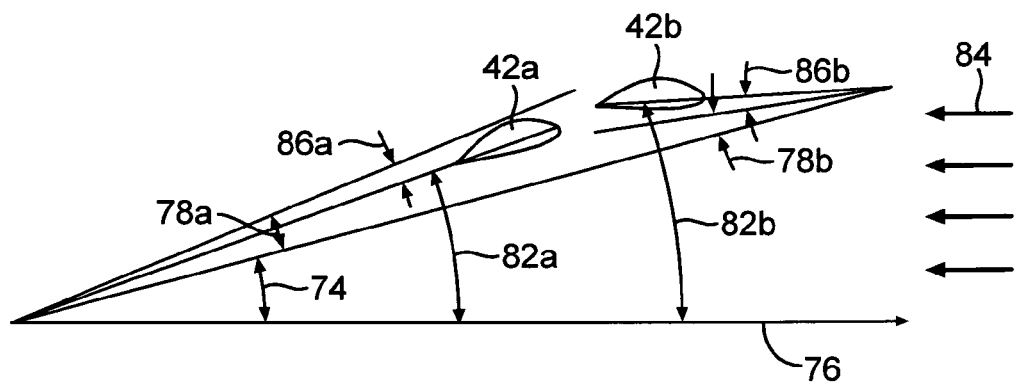
FIG. 4A is an end elevation cross-sectional view of advancing and retreating blades having pitch angles of attack in accordance with an embodiment of the present invention.

FIG. 4A illustrates a cross section of an advancing blade 42a, i.e., a blade 42 moving in the flight direction 76, relative to the fuselage 12 and a cross section of a retreating blade 42b, i.e., a blade moving opposite the flight direction 76 relative to the fuselage. As noted above, the blades 42 rotate generally in a rotor disc 70 that is generally perpendicular to the axis of rotation 72 of the rotor 40 and the angle of the rotor disc 70 relative to the flight direction 76 is the angle of attack 74.

As noted above, flying up and flying down, a motion called flapping, of the blade 42 tends to reduce the net angle of attack 82a of the advancing blade 42a and increase the net angle of attack 82b of the retreating blade 42b. The angle of attack 82a of the advancing blade 42a with respect to airflow 84 parallel to the flight direction 76 is therefore the sum of the pitch angle 78a of the advancing blade 42a and the angle of attack 74 of the rotor disc 48 less a flapping angle 86a corresponding to a reduction in angle of attack 82a due to flapping. The angle of attack 82b of the retreating blade 42b with respect to the airflow 84 is equal to the angle of attack 74 minus the pitch angle 78b of the blade 42b and minus a flapping angle 86b corresponding to an increase in the forward flow angle of attack due to flapping.

Figure 4B:
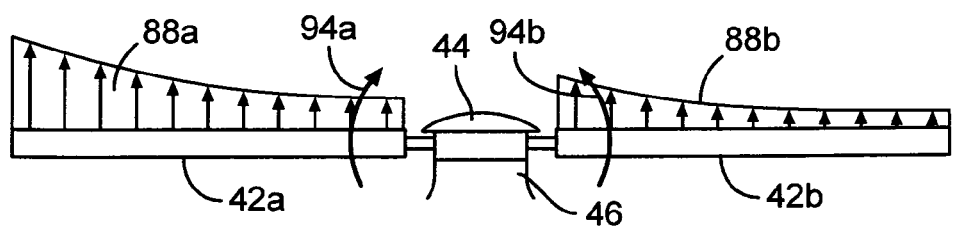
FIG. 4B is a load diagram illustrating lift on rotor blades in accordance with an embodiment of the present invention.

Referring to FIG. 4B, where the angle of attack 82b is negative, the retreating blade 42b experiences negative lift 88b when the velocity of the airflow 84, i.e., the velocity of the aircraft 10 relative to the surrounding air, is larger than the rearward velocity of the retreating blade 42b. The advancing blade 42a experiences positive lift 88b due to its positive angle of attack 82a relative to the airflow 84 and due to its forward movement relative to the aircraft 10. The positive lift 88a on the advancing blade 42a generates a moment 90a on the advancing blade that is transferred to the hub 44 and mast 46.

Where negative lift 88b occurs on the retreating blade 42b, a moment 90b is also generated and transferred to the hub 44 and mast 46. Where the moments 90a, 90b are in the same direction or out of phase, such as for rotors 40 having an odd number of blades 42, a cyclic load is exerted on the hub 44 and mast 46 that can result in large amounts of force and vibration being transferred to the aircraft 10.

In some embodiments, the blades 42 are rigidly (with respect to flapping) attached to the hub 44. In such embodiments, the moments 90a, 90b can also result in a cyclical bending load on the mast 46 that can be very large. The mast 46 would therefore need to be made strong enough to bear such bending loads, which would increases the size and weight of the mast.

In autogyro systems, the angle of attack 74 of the rotor disc 70 is generally positive in order to achieve autorotation of the rotor 40, which in turn generates lift. In some embodiments, the angle of attack 82b of the retreating blade 42b with respect to the airflow 84 is positive when the angle of attack 74 of the rotor disc 70 is larger than the pitch angle 78b of the retreating blade 42b plus the flapping angle 86b. In such embodiments, the retreating blade 42b often experiences positive lift 88b when the velocity of the airflow 84 is larger than the forward velocity of the retreating blade 42b due to its sufficiently low rearward velocity relative to the fuselage 12 (opposite the flight direction) in view of the sufficiently high forward velocity of the fuselage 12.

In the art of rotary wing design, an advance ratio is used to characterize the frequency of rotor rotation with respect to velocity. The advance ratio is typically calculated as the airspeed of the aircraft 10 divided by the speed at the tip of the blades 42 relative to the aircraft 10. At virtually all airspeeds, a portion of the retreating blade 42b is moving, relative to the aircraft, slower than the forward airspeed of the aircraft and therefore has reverse airflow thereover, i.e., air flow in the direction of blade movement relative to the fuselage 12. Thus, during vertical takeoff, the advance ratio is zero. For advance ratios larger than about 0.7 to 0.8, the effect of reverse airflow becomes greater than the effect of forward airflow on the retreating blade 42b. At advance ratios higher than 1.0, the entire retreating blade 42b is subject to reverse airflow. Passing from the trailing edge to the leading edge.

In flight configurations where the angle of attack 82b of the retreating blade 42b is positive with respect to the airflow 84, the retreating blade 42b will experience positive lift 88b along the entire length thereof. Lift 88b on the retreating blade 42b is at a maximum when the retreating blade 42b extends generally perpendicular to the flight direction 76. Likewise, lift on the advancing blade 42a is at a maximum when the advancing blade 42a extends generally perpendicular to the flight direction 76.

Experiments conducted by the inventors have shown that the lift on an individual blade 42 varies cyclically as the blade 42 makes a full rotation. In the mode of operation illustrated in FIG. 4A, at advance ratios higher than about 0.7 to 0.8, the cyclical loading due to an individual blade 42 has been found to have a frequency of 2F, where F is the frequency at which the blade 42 makes a full rotation, inasmuch as each blade 42 has two lift maxima per revolution. A maximum occurs once while the blade 42 is advancing and again while the blade 42 is retreating. Accordingly, the frequency of loading is 2NF, where N is the number of blades 42.

In general, the amount of vibration suppression required to isolate a vibration is inversely proportional to frequency squared, or $1/f^2$, where f is the frequency of vibration. Accordingly, low frequency vibrations on the order of 2NF require a large amount of vibration suppression. This translates to increased weight and bulkiness of vibration suppression systems.

Where the number of blades 42 is even and the blades are distributed at equal angular intervals, each retreating blade 42b will have a maximum lift 88b at the same time as an advancing blade 42a has a maximum lift 88a. Accordingly, the moment 90a and the moment 90b are in opposite directions. The net bending moment exerted on the hub 44 and mast 46 will be equal to the difference between the moment 90a and the moment 90b. The moments 90a, 90b may be called rolling moments 90a, 90b inasmuch as they tend to urge rotation about the longitudinal axis 34.

At advance ratios higher than 1.0, the net rolling moment, defined as the difference between the moments 90a, 90b, may be made small enough to significantly reduce the amount of vibration suppression required. In some embodiments of systems and aircrafts in accordance with the present invention, the airspeed of the fuselage 12 and the angular frequency of the rotor 40 are such that the advance ratio is greater than or equal to 2.0. It may even equal or exceed 2.5 in currently contemplated embodiments. The airspeed of the fuselage at which balancing of rolling moments 90a, 90b is advantageously used may include 200 miles per hour, preferably 300 miles per hour, and more preferably 400 miles per hour.

In some embodiments of the present invention one or more of the angle of attack 74, cyclic adjustment of the pitch angles 78a, 78b, and the angular frequency of rotation of the rotor 40 are selected for a given airspeed such that the moment 90b is between 0.2 and 0.8 times the bending moment 90a, preferably between 0.3 and 0.7 times the bending moment 90a.

The difference between the moments 90a, 90b may be reduced by reducing the angular velocity of the rotor 40. Lift over an airfoil increases proportionally to $v^2$, where v is the velocity of air flow over the airfoil. A simplified representation of the velocity of air over a discrete portion of the advancing blade 42 is $(V_a+V_r)$ when the blade 42 extends from the aircraft 10 perpendicular to the air flow 84, where $V_a$ is the velocity vector of airflow 84 relative to the fuselage 12 and $V_r$ is the velocity vector of the discrete portion of the blade relative to the fuselage 12. $V_r$ is oriented approximately tangent to the arc described by the discrete portion of the blade 42. It has magnitude equal to $r\Omega$, where r is radius and $\Omega$ is angular velocity, plus any contribution to the velocity due to flapping.

For the retreating blade 42b, the velocity $V_r$ is generally opposing the velocity $V_a$ such that the resultant velocity $(V_a+V_r)$ is smaller than that of the advancing blade 42a. Inasmuch as the magnitude of $V_r$ generally corresponds to $r\Omega$ if flapping is ignored, reducing the value of $\Omega$ will therefore reduce the difference between the moments 90a, 90b. Where the value of $V_a$ is large, the contribution of the $r\Omega$ term is reduced and the moments 90a, 90b on the advancing and retreating blade are brought closer to equilibrium.

Flapping of the blades 42 will tend to further reduce the difference in lift 86a, 86b of the advancing and retreating blades 42a, 42b as described hereinabove. In embodiments where the retreating blade 42b is subject to reverse flow, the retreating blade 42b may also flap upward similar to the advancing blade.

The difference between the lift forces 88a, 88b, and the corresponding difference between the moments 90a, 90b, may also be reduced by increasing the angle of attack 82b of the retreating blade 42b relative to the airflow 84. This may be accomplished by performing one or both of decreasing the pitch angle 78b of the retreating blade 42b and increasing the angle of attack 74 of the rotor disc 70. Both of these would result in an increase in the angle of attack 82b of the retreating blade 42b and a corresponding increase in lift, up to the point where stalling occurs.

The pitch angle 78b of the retreating blade 42b may be adjusted by means of cyclic pitch control of the pitch angles 78b, such as by using a swash plate pitch-control system, whether new or as known in the art of rotary wing aircraft design. In a like manner, changing the angle of attack 74 may be performed using apparatus for changing tilt of the mast 46.

In embodiments of the present invention, the angle of attack 82b of the retreating blade 42b may be between 3 and 0 degrees, preferably between 2 and 0 degrees, larger than the angle of attack 82a of the advancing blade 42a during sustained longitudinal flight, i.e., even when the aircraft is not performing pitching or rolling movement. In prior rotating wing aircraft, the angle of attack 82b of the retreating blade 42b is significantly larger than the angle of attack 82a of the advancing blade 42a due to flapping in order to equalize lift during sustained longitudinal flight.

Referring to FIG. 5A, in autogyro aircraft, the lift vector L on a discrete portion of the blade 42 is perpendicular to the air velocity vector $V_T$ over the discrete portion of the blade and is generally proportional to $\alpha V_T^2$, where $V_T$ is the resultant vector $(V_a+V_r)$ and a is the angle of attack 82. Air flow over the discrete portion of the blade 42 additionally results in a drag force vector D. A component of the resultant vector (L+D) is in the plane of rotation of the blade 42, i.e. the rotor disc 48, which path? does not remain perfectly planar, and is designated as $F_R$ in FIG. 5A. In the force diagram of FIG. 5A, where the blade 42 is an advancing blade 42a, $F_R$ is oriented in the direction of blade rotation and tends to urge the rotor 40 to rotate in a positive direction.

Referring to FIG. 5B, where the blade 42 is a retreating blade 42b and is experiencing lift due to reverse airflow, $F_R$ opposes blade rotation and tends to hinder rotation of the rotor 40. A moment 94a due to the $F_R$ time s r integrated along the length of the advancing blade 42a must be larger than a corresponding moment 94b exerted on the retreating blade 42b in order for the rotor 40 to rotate in a positive direction. Where the moment 94a is less than the moment 94b, the rotor 40 is compelled to rotate in a negative direction.

For purposes of this disclosure, a positive direction refers to a direction of rotation in which the rotor 40 would autorotate in the absence of reverse flow over the retreating blade and in which the rotor 40 rotates during hover. For purposes of this disclosure rotation compelled in the positive direction is referred to as positive autorotation. Rotation compelled in the negative direction is referred to as negative autorotation.

Where one or both of the angle of attack 74 and cyclic adjustment of the pitch angles 78a, 78b are selected to be effective to reduce a difference between the moments 90a, 90b, the rate of autorotation may be reduced and may even become negative. Accordingly, in some embodiments, one or both of cyclic adjustment of the pitch angles 78a, 78b and adjustment of the angle of attack 74 may be selected to reduce the difference between the moments 90a, 90b up to the point that the rotor 40 experiences positive autorotation greater than or equal to a minimum autorotation frequency. In general, the minimum frequency is determined by the properties of the blades 42 and the airspeed of the aircraft 10. The minimum frequency is that at which the centrifugal forces exerted on the blades 42 are sufficient to provide a radial load sufficient to maintain mechanical stiffness and stability of the blades 42. Maintaining stability of the blades 42 may include avoiding destructive harmonics and generating sufficient centrifugal force to prevent excessive bending and twisting of the blades in response to air flow thereover, as determined by the properties of the blade and requirements of aeronautical stability of the aircraft 10 as known in the art of rotary aircraft design.

Referring to FIGS. 6A and 6B, in some embodiments, drag on the blades 42 is cyclically increased such that drag on the retreating blade 42b is higher than drag on the advancing blade 42a. In this manner, the drag on the retreating blade 42b urges the rotor 40 to autorotate in the positive direction. The lift on the retreating blade 42b can be increased above the point where the difference between the moment 94a and the moment 94b would exceed the net moment needed to maintain autorotation above the minimum autorotation frequency as described hereinabove.

Figure 7:
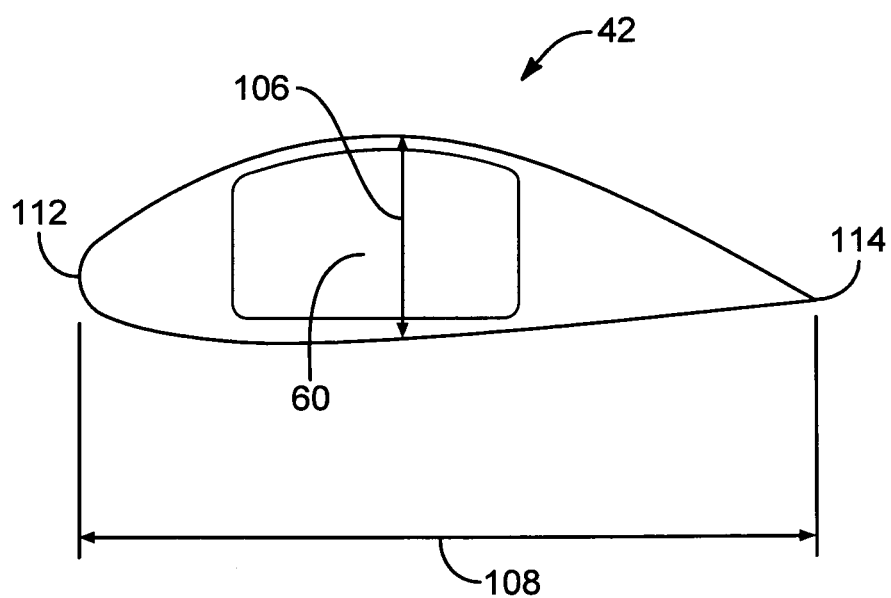
FIG. 7 is an end elevation cross sectional view of one embodiment of a blade in accordance with the present invention.

Various methods for cyclically increasing the drag on a rotor blade 42 may be used. For example, flaps 96 located at or near tips 98 of the blades 42 may be urged outward from the upper and lower surfaces 100a, 100b of the blade 42 while the blade 42 is moving in the retreating direction. As shown in FIG. 7A this profile increases the drag at the tip 98. Flaps 96 may be closed while the blade 42 is moving in the advancing direction, as shown in FIG. 7B in order to reduce drag at the tip 98.

In some embodiments, a control signal and/or an actuating force to change the orientation of the flaps 96 is transmitted through control lines 102 extending from the hub 44, through the blades 42, and to the flaps 96. The control lines 102 may be embodied as cables, electrical wires, hydraulic lines, or the like. The control lines 102 may be coupled to a flight control system within the fuselage 12 by means of a slip ring system. An embodiment of a system for cyclically increasing the drag of the retreating blade 42b is disclosed in U.S. Patent Application Ser. No. 61/381,347, filed Sep. 9, 2010 and entitled ANEMOMETER DRIVE APPARATUS AND METHOD, which is hereby incorporated herein in its entirety Referring to FIG. 7, any rotor 40 having an even number of blades 42 can benefit from the reduction in rolling moment due to opposing moments 90a, 90b as described hereinabove. As noted above with respect to FIG. 2, the blades 42 may have a cross section permitting the placement of ducts 60 therethrough for conducting air to tip jets 50. However, the cross section of the blades 42 must also be effective to achieve lift. In general, one property affecting lift of an air foil is the ratio of the thickness 106 of the airfoil with respect to the length 108 of the chord of the airfoil.

The thickness 106 and chord length 108 for a given number of blades 42 is generally determined by the amount of lift needed according to design constraints. The area available for placement of ducts 60 is therefore generally constrained to fit within an airfoil having the thickness 106 and chord length 108 suitable for achieving the needed lift. Deviation from the optimum thickness 106 and chord 108 may be possible, but may increase the drag on the airfoil and such deviation is therefore undesirable.

A smaller, even number of blades 42 may be preferable where the blades 42 include ducts 60, inasmuch as the needed chord length 108 of the blades 42 generally increases as the number of blades decreases for a given lift requirement. The thickness 106 of the blades 42 needed to achieve a certain amount of lift, therefore, also increases and provides greater area for placement of ducts 60. This reduces the amount of pressure required to achieve a desired flow rate of air through the ducts 60.

Rotors 40 having two blades 42 are subject to vibrations that increase rapidly in force with an increase in speed and are therefore unsuitable for high speed flight. Experiments conducted by the inventors have indicated that rotors 40 having four blades 42 are preferable inasmuch as they provide adequate area for placement of ducts 54 and provide balancing of rolling moments 90a, 90b as outlined hereinabove. Even numbers of blades 42 as high as 10 may also be suitable, particularly where air flow through ducts 54 within the blades 42 is not used.

The cross section of the blade 42 may be designed to provide lift for air flow from the leading edge 112 to the trailing edge 114 and from the trailing edge 114 to the leading edge 112 such that lift may be generated for both forward and reverse air flow. In some embodiments, the blade 42 is symmetrical, such as when the coefficient of lift for the blade 42 is the same for both forward and reverse flow.

Figure 8:
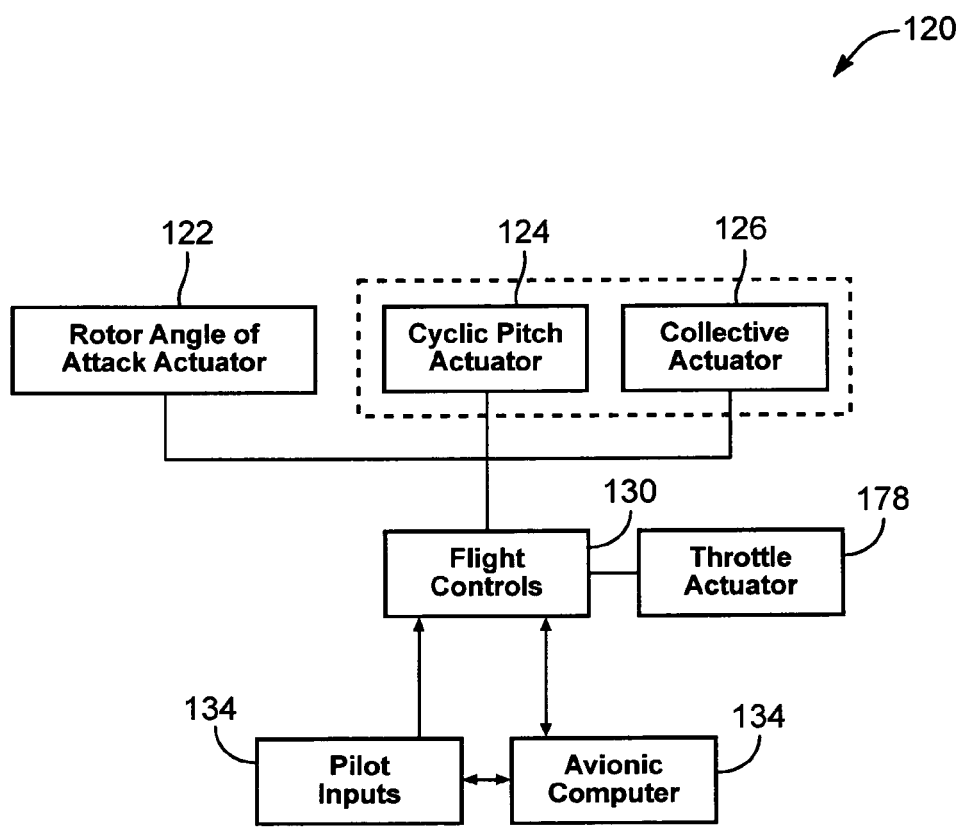
FIG. 8 is a schematic block diagram of a flight control system suitable for use in accordance with an embodiment of the present invention.

Referring to FIG. 8, an aircraft 10 may be controlled by a control system 120. The control system 120 may include a rotor angle of attack actuator 122 for changing the angle of attack 74 of the rotor disc 70. The angle of attack actuator 122 may include systems known in the art for tilting the mast 46 and/or rotor disc 70 of both powered, e.g., helicopter, and unpowered, e.g., autogyro, aircraft. The control system 120 may further include a cyclic pitch actuator 124 and a collective pitch actuator 126.

In some embodiments, the cyclic pitch actuator 124 and collective pitch actuator 126 are embodied by a single actuator. The cyclic and collective pitch actuators 124, 126 may be embodied as a swash plate pitch-control system with corresponding actuators and transfer linkages selected from the art of rotary-wings aircraft design. The control system 120 may further include one or more throttle actuators 128 for controlling the functioning of the main propulsion engines 48 and any auxiliary engines of the aircraft 10, such as the tip jets 50.

The actuators 122-128 may be controlled by means of flight controls 130 receiving pilot inputs 132 as well as input from an avionics computer 134. The pilot inputs 132 may include conventional aircraft and helicopter inputs. For example, the pilot may be provided with controls for specifying collective pitch, cyclic pitch, and throttle position, as well as controls for specifying the position of control surfaces 16 such as the rudder 22, elevator 30, and ailerons 36. The flight controls 130 may translate pilot inputs 132 directly into control signals for the actuators 122-128 or may translate the pilot inputs 132 into control signals for the actuators 122-128 using programmed flight control logic.

Figure 9:
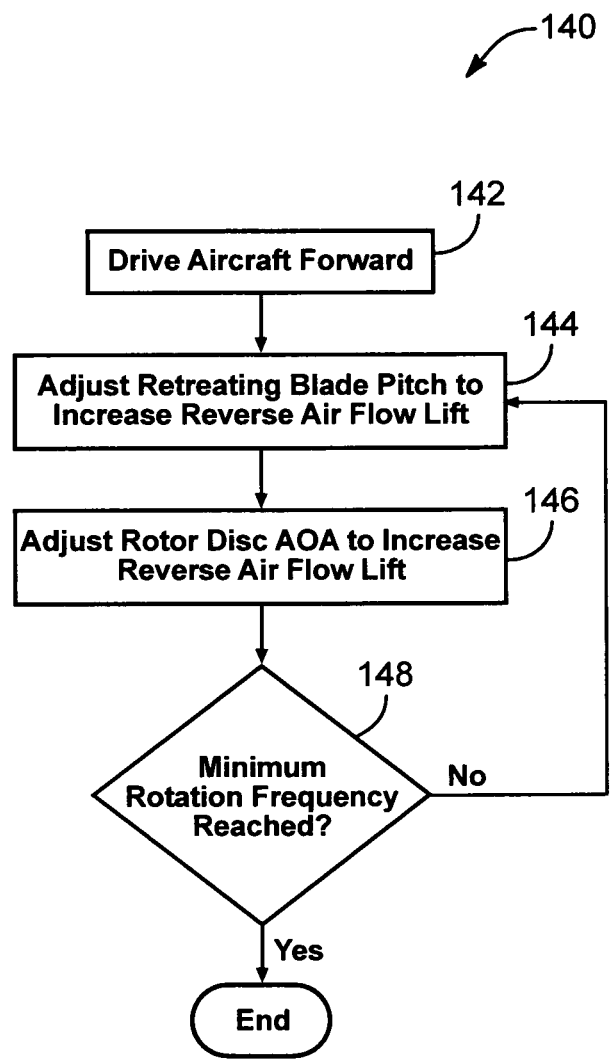
FIG. 9 is a process flow diagram of a method for equalizing rolling movements in accordance with an embodiment of the present invention.

Referring to FIG. 9, a method 140 for flying an aircraft 10 may be performed using the control system 120 of FIG. 10 or some other flight control system. In some embodiments, the avionics computer 134 or the flight controls 130 are programmed to perform the method 140. The method 140 may include driving an aircraft forward in a flight direction by means of a thrust source at a given airspeed at step 142. Driving the aircraft forward may include providing a manual or automated input to a throttle actuator 128 controlling a jet engine 50.

At step 144, the pitch angle 78b of the retreating blade 42b is adjusted to increase lift on the retreating blade 42b due to reverse airflow over the retreating blade effective to reduce a difference between the rolling moments 90a 90b of the advancing and retreating blades 42a, 42b as described hereinabove. At step 146, the rotor disc angle of attack 74 is adjusted manually or automatically to increase lift on the retreating blade 42b due to reverse airflow over the retreating blade effective to reduce a difference between the rolling moments 90a 90b of the advancing and retreating blades as described hereinabove.

At step 148, the frequency of revolution of the rotor 40 is evaluated with respect to a minimum rotational frequency. If the frequency of revolution of the rotor 40 is less than, equal to, or within a predetermined tolerance of, the minimum rotational frequency, the method 140 may be suspended for a time such that the minimum rotational frequency does not fall below the minimum rotational frequency. Steps 144 and 146 may be performed simultaneously.

The above description of embodiments of the invention is merely exemplary in nature and, thus, variations thereof are not to be regarded as a departure from the spirit and scope of the invention. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for operating a rotary wing aircraft comprising:
impelling the aircraft in a forward direction at an airspeed by means of a thrust source, the aircraft having secured thereto a rotor comprising an even number of blades secured at equal angular intervals around a rotor hub rotationally mounted to the aircraft, the rotor operable to rotate about an axis of rotation; and
rotating the rotor at an angular velocity with respect to the aircraft such that each blade is alternately moving in a retreating direction and an advancing direction with respect to the aircraft, the retreating direction having a component opposite the forward direction and the advancing direction having a component in the forward direction;

wherein the angular velocity and airspeed are effective to cause a positive total lift on each blade due to air flow over the blades in the retreating direction, wherein each blade defines a pitch angle relative to a direction of blade movement, the method further comprising:

cyclically modulating the pitch angle effective to cause a bending moment induced on the blades when moving in the retreating direction due to lift to be equal to between 0.3 and 0.7 times a bending moment induced on the blades when moving in the advancing direction due to lift when the blade is moving in the retreating direction;

determining that a rotational frequency of the rotor is less than a minimum rotational frequency;

in response to determining that the rotational frequency of the rotor is less than the minimum rotational frequency, suspending cyclically modulating the pitch angle effective to cause the bending moment induced on the blades when moving in the retreating direction due to lift to be equal to between 0.3 and 0.7 times the bending moment induced on the blades when moving in the advancing direction due to lift when the blade is moving in the retreating direction.

2. The method of claim 1, wherein the number of blades is four.

3. The method of claim 1, wherein rotation of the rotor defines a rotor disc and wherein the rotor disc defines an angle of attack above the forward direction; and wherein the angle of attack is effective to cause the bending moment on the blades when moving in the retreating direction due to lift to be equal to from about 0.3 to about 0.7 times the bending moment on the blades when moving in the advancing direction due to lift.

4. The method of claim 1, wherein the blades are rigidly connected to the rotor hub.

5. The method of claim 1, wherein the aircraft comprises fixed wings, the fixed wings providing lift sufficient to support at least 50 percent of a weight of the aircraft for airspeeds greater than 200 miles per hour.

6. The method of claim 1, wherein the aircraft comprises fixed wings, the fixed wings providing lift sufficient to support at least 90 percent of a weight of the aircraft for airspeeds greater than 200 miles per hour.

7. The method of claim 1, wherein the airspeed is greater than 200 miles per hour.

8. The method of claim 1, wherein tips of the blades have a tip speed and wherein the airspeed of the aircraft divided by the tip speed is greater than from about 0.7 to about 2.5.

9. The method of claim 1, wherein:
jets are secured to tips of the blades;
the blades each define an air channel; and
the jets are in fluid communication with a compressed air source through the air channel.

10. The method of claim 9, wherein:
the thrust source is a jet engine;
the compressed air source comprises a bypass turbine of the jet engine; and the method further comprises cyclically increasing the drag on the blades when the blades are moving in the retreating direction.

11. An aircraft comprising:
a fuselage;
a thrust source coupled to the fuselage to urge the fuselage in a forward direction at an airspeed;
a rotor including an even number of blades secured at equal angular intervals around a rotor hub rotatably mounted to the fuselage, the rotor operable to rotate relative to the fuselage at an angular velocity such that each blade is alternately moving in a retreating direction and an advancing direction with respect to the aircraft, the retreating direction having a component opposite the forward direction and the advancing direction having a component in the forward direction;
the rotor, wherein each blade defines a pitch angle relative to a direction of blade movement and wherein an actuated flap is secured at a distal end of each blade;
a flight control system coupled to the actuated flaps and programmed to control the angular velocity effective to cause a positive total lift on each blade due to air flow in the retreating direction when the blade is moving in the retreating direction; and
the flight control system further programmed to cyclically modulate the pitch angle effective to cause a bending moment induced on the blades when moving in the retreating direction due to lift to be equal to between 0.3 and 0.7 times a bending moment induced on the blades when moving in the advancing direction due to lift;
the flight control system further programmed to open the actuated flap of each blade when moving in the retreating direction and close the actuated flap of each blade when moving in the advancing direction.

12. The aircraft of claim 11, wherein rotation of the rotor defines a rotor disc and wherein the rotor disc defines an angle of attack above the forward direction; and wherein the flight control system is programmed to adjust the angle of attack effective to cause the bending moment on the blades when moving in the retreating direction due to lift to be equal to between 0.3 and 0.7 times the bending moment on the blades when moving in the advancing direction due to lift.

13. The aircraft of claim 11, wherein the blades are rigidly connected to the rotor hub.

14. The aircraft of claim 11, wherein the aircraft further comprises fixed wings, the fixed wings providing lift sufficient to support at least 50 percent of a weight of the aircraft for airspeeds greater than 200 miles per hour.

15. The aircraft of claim 11, further comprising:
a compressed air source coupled to the fuselage, the blades comprising ducts in fluid communication with the compressed air source; and
jets secured to tips of the blades in fluid communication with the ducts.

16. The aircraft of claim 15, wherein the thrust source is a jet engine and wherein the compressed air source comprises a bypass turbine of the jet engine.

* * * * *